United States Patent [19]

Sato et al.

[11] 4,428,010
[45] Jan. 24, 1984

[54] DRIVE MODE SWITCHING DEVICE FOR MAGNETIC TAPE RECORDER/REPRODUCER

[75] Inventors: Reisuke Sato; Shizuo Ando, both of Saitama, Japan

[73] Assignee: Pioneer Electronic Corporation, Tokyo, Japan

[21] Appl. No.: 295,964

[22] Filed: Aug. 25, 1981

[30] Foreign Application Priority Data

Aug. 27, 1980 [JP]  Japan ................................. 55-116965

[51] Int. Cl.³ ............................................. G11B 15/18
[52] U.S. Cl. .................................... 360/73; 360/74.1; 360/137
[58] Field of Search ....................... 360/55, 69, 71, 73, 360/74.1, 88, 137

[56] References Cited

U.S. PATENT DOCUMENTS 4,176,383  11/1979  Suzuki .............................. 360/137 X
4,280,152  7/1981  Silver ............................... 360/137 X Primary Examiner—Robert L. Richardson
Attorney, Agent, or Firm—Sughrue, Mion, Zinn, Macpeak and Seas

[57] ABSTRACT

A tape recorder/reproducer of the automatic reverse type includes fast forward and reverse buttons which are switchably connected to the fast tape speed direction controls so that the desired operation corresponding to the actuated button is carried out irrespective of whether the tape is currently being played in the normal or reverse direction.

9 Claims, 9 Drawing Figures

DRIVE MODE SWITCHING DEVICE FOR MAGNETIC TAPE RECORDER/REPRODUCER

BACKGROUND OF THE INVENTION

The present invention relates to a magnetic tape recorder/reproducer. More particularly, the invention relates to a drive mode switching device for a magnetic tape recorder/reproducer.

In the automatic reverse type magnetic tape recorders/reproducers the tape can be played in both the normal and the reverse directions, thereby eliminating the need to remove and flip the tape over, as is necessary in the non-reverse recorders/reproducers. Obviously in such systems, fast forward and rewind have directions depending upon the direction the tape is being played. In the reverse type systems heretofore it has always been necessary for the operator to ascertain the tape playing direction before ascertaining which buttons need to be depressed to effectuate the desired operation of fast forward or rewind.

One example of part of a conventional control panel for an automatic reverse type magnetic tape recorder/reproducer is shown in FIG. 1 and comprises laterally disposed normal and reverse direction buttons 1 and 2, respectively, plus a fast and stop button 3. When the tape is playing in either the normal or the reverse directions a fast forward operation can be effected simply by depressing the fast button 3. As a result the tape will travel at a fast speed in the direction it was previously travelling. However, in order to bring about a rewind operation, the operator must first ascertain the current direction of the tape, and then depress the opposite direction button and the fast button. The need to ascertain the current direction is an inconvenience at best, and in the case of an automobile tape recorder/reproducer, can be a safety hazard.

In a conventional automotive stereophonic magnetic tape recorder/reproducer, as shown in FIG. 2, most recorders/reproducers employ a normal/reverse switching button 4 for selecting the magnetic tape drive direction, a fast forward drive switching button 5 for selecting the fast forward mode and a rewind drive switching button 6 for selecting the rewind mode in a selection type.

In order to change the direction of the tape it is only necessary to actuate button 4. However, to institute fast forward or rewind it is necessary to ascertain the direction of the tape in order to know which of buttons 5 and 6 need be actuated. This can typically be accomplished by viewing the condition of button 4. In the case of an automotive stereophonic magnetic tape recorder/reproducer, the necessity of the aforementioned confirming operation creates an undesirable safety hazard in driving an automobile.

SUMMARY OF THE INVENTION

Accordingly, a primary object of the present invention is to provide a drive mode switching device for a magnetic tape recorder/reproducer in which the need to confirm the present magnetic tape drive direction is eliminated by providing an arrangement in which magnetic tape is driven in a fast forward mode in a present tape drive direction and is also driven in a rewind mode in an opposite direction to the present tape drive direction.

DETAILED DESCRIPTION OF THE PREFERRED EMBODIMENTS

Figure 3:
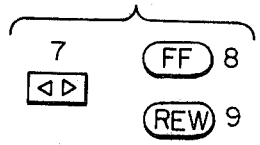
FIG. 3 is an explanatory view of a preferred embodiment of the control panel of the automatic reverse magnetic tape recorder/reproducer constructed according to the present invention.

A preferred embodiment of a drive mode switching device for a magnetic tape recorder/reproducer constructed according to the present invention will be described with reference to the drawings, particularly to FIG. 3, showing a control panel of the magnetic tape recorder/reproducer. The drive mode switching device includes a normal/reverse switching button 7, a fast forward drive switching button 8 and a rewind drive switching button 9. When the fast forward drive switching button 8 is depressed, the magnetic tape is driven in a fast forward mode in the direction selected at present by the normal/reverse drive switching button 7. When the rewind drive switching button 9 is depressed, the magnetic tape is driven in a rewind mode in the direction opposite to the direction selected at present.

Accordingly, it is not necessary to confirm the present magnetic tape drive direction when switching the tape in the drive mode. If, for example, the operator wants to skip over the song presently being played, only the fast forward drive switching button 8 need be depressed. If the operator wants to start the song over at the beginning, only the rewind drive switching button 9 need be depressed. Consequently, if it is desired to switch the tape drive mode it is only necessary to locate and depress the fast forward drive switching button 8 or the rewind drive switching button 9, and there is no need to confirm the present magnetic tape drive direction. This eliminates a safety hazard.

Figure 4:
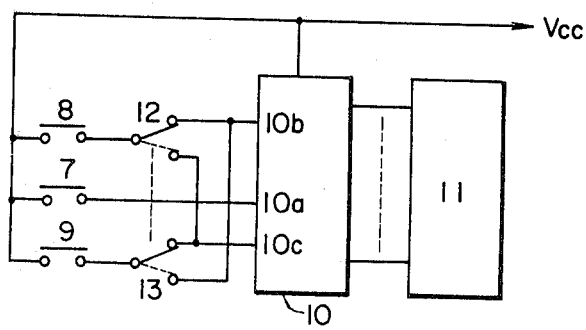
FIG. 4 is a circuit diagram showing the operation of the embodiment shown in FIG. 3.

FIG. 4 shows a circuit diagram for carrying out the operation of the arrangement shown in FIG. 3. Reference numeral 10 designates a control circuit configured in the same manner as a conventional control circuit and includes a normal/reverse drive switching signal input terminal 10a, a normal direction fast forward drive signal input terminal 10b and a reverse direction rewind drive signal input terminal 10c. The output side of the control circuit 10 is connected to a tape mechanism 11. Switches 12 and 13 are interlocked to each other, and are also interlocked to the switching operation of the normal/reverse drive switching button 7. More specifically, when the normal/reverse drive switching button 7 is switched to a normal direction drive position, the switches 12 and 13 are switched to connect as shown by solid lines in FIG. 4. When the normal/reverse drive switching button 7 is, on the contrary, switched to a reverse direction drive position, the switches 12 and 13 are switched to connect as shown in broken lines in FIG. 4. That is, the fast forward drive switching button 8 is operated as a rewind mode at a reverse magnetic tape driving time, and the rewind drive switching button 9 is operated as a fast forward mode. It should be noted that if the switches 12 and 13 include spare head switching contacts, the latter may also be used therefor.

Figure 5:
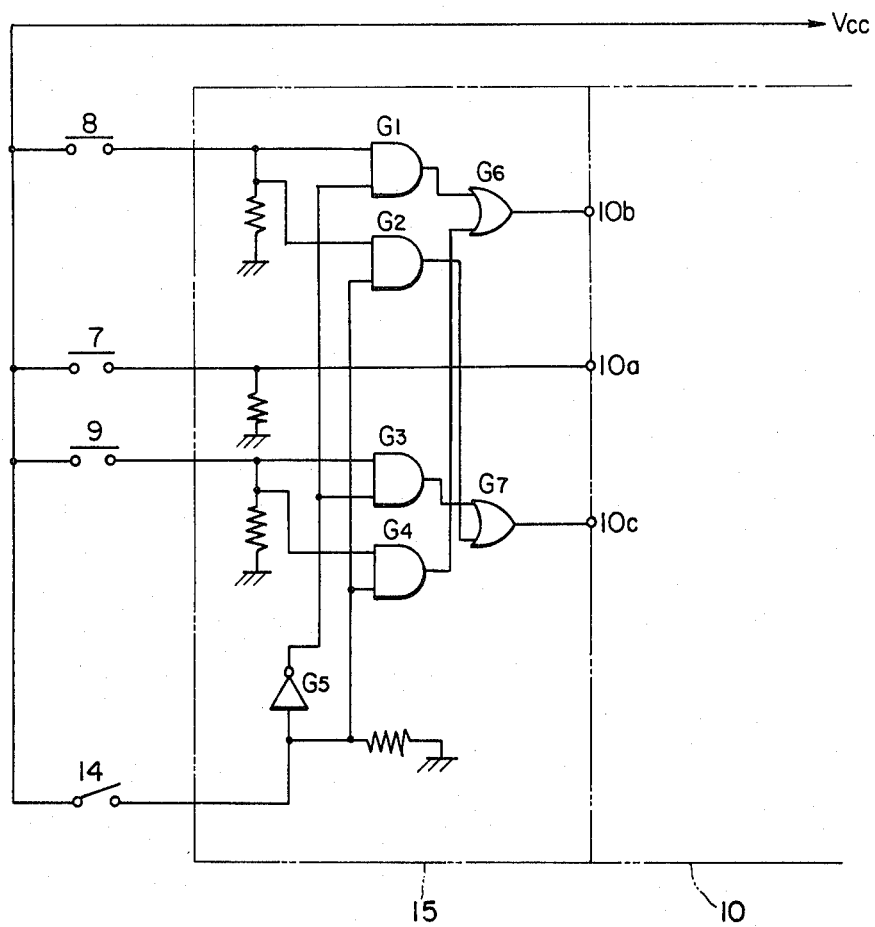
FIG. 5 is a circuit diagram showing another preferred embodiment of the arrangement shown in FIG. 4.

FIG. 5 shows another preferred embodiment of the drive mode switching device employing only one switch instead of the two switches 12 and 13 shown in FIG. 4. A switch 14 is interlocked to a head changeover switch or the like so as to be turned off when the magnetic tape is driven in the normal direction and turned on when the magnetic tape is driven in the reverse direction.

Reference characters $G_1$ through $G_4$ designate AND gates, $G_5$ an inverter, and $G_6$ and $G_7$ OR gates. When the switch 14 is turned off and the magnetic tape is driven in a normal direction, only the AND gates $G_1$ and $G_3$ are opened, and a signal from the fast forward drive switching button 8 is fed through the AND gate $G_1$ and the OR gate $G_6$ to the normal direction fast forward drive signal input terminal 10b, and the signal from the rewind drive switching button 9 is fed through the AND gate $G_3$ and the OR gate $G_7$ to the reverse direction rewind drive signal input terminal 10c. When the switch 14 is turned on and the magnetic tape is driven in a reverse direction, only the AND gates $G_2$ and $G_4$ are opened, and a signal from the fast forward drive switching button 8 is fed through the AND gate $G_2$ and the OR gate $G_7$ to the reverse direction rewind drive signal input terminal 10c, and a signal from the rewind drive switching button 9 is fed through the AND gate $G_4$ and the OR gate $G_6$ to the normal direction fast forward drive signal input terminal 10b. It should be noted that in this embodiment a logic circuit 15 may be provided as an integrated circuit for connection to the control circuit 10.

Figure 1:
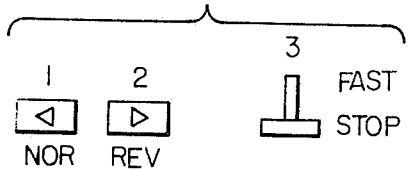
FIG. 1 is an explanatory view of the control panel of a conventional automatic reverse type magnetic tape recorder/reproducer.
Figure 6:
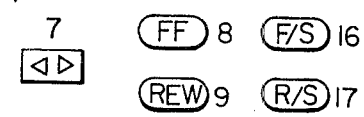
FIG. 6 is a view showing still another preferred embodiment of the control panel of the invention.
Figure 2:
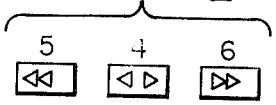
FIG. 2 is an explanatory view of another example of the control panel of the conventional automatic reverse type magnetic tape recorder/reproducer.

FIG. 6 shows another preferred embodiment of the drive mode switching device employing, in addition to the buttons shown in FIG. 3, a normal direction song searching button 16 for searching the beginning of a desired song and a reverse direction song searching button 17.

In the arrangement shown in FIG. 6, if a song subsequent to that presently being played is desired, the normal direction song searching button 16 may be depressed. Thus, the magnetic tape is driven in a fast forward mode in whichever direction the tape is presently being driven, and the song subsequent to the song presently being played is reproduced from the beginning. If it is desired to start the song presently being played from the beginning, the reverse direction song searching button 17 may be depressed. Thus, the magnetic tape is driven in a rewind mode in the direction opposite to the present magnetic tape driving direction, and the song played at present is reproduced from the beginning. Consequently, according to the arrangement shown in FIG. 6, the song searching operation can be carried out without confirming the present magnetic tape drive direction, but merely by locating the corresponding button. The song search buttons 16 and 17 can be connected to respective forward and reverse song search terminals of a control circuit 10 through a mechanical switching circuit similar to FIG. 4 or a logic circuit similar to FIG. 5.

Figure 7:
FIG. 7 is a view showing still another preferred embodiment of the control panel of the invention.

FIG. 7 shows still another embodiment of the drive mode switching device employing a song searching button 18. In this arrangement, when the fast forward drive switching button 8 is first depressed and the song searching button 18 is then depressed, the magnetic tape is driven in a fast forward mode in the present magnetic tape driving direction, and the next song is reproduded from the beginning. When the rewind drive switching button 9 is first depressed and the song search button 18 is then depressed, the magnetic tape is driven in a rewind mode in a direction opposite to the present magnetic tape driving direction, and the song being played at present is reproduced from the beginning. It should be noted that in this embodiment the number of operating buttons is reduced as compared with the arrangement shown in FIG. 6, and it is easier to find the appropriate button.

Figure 8:
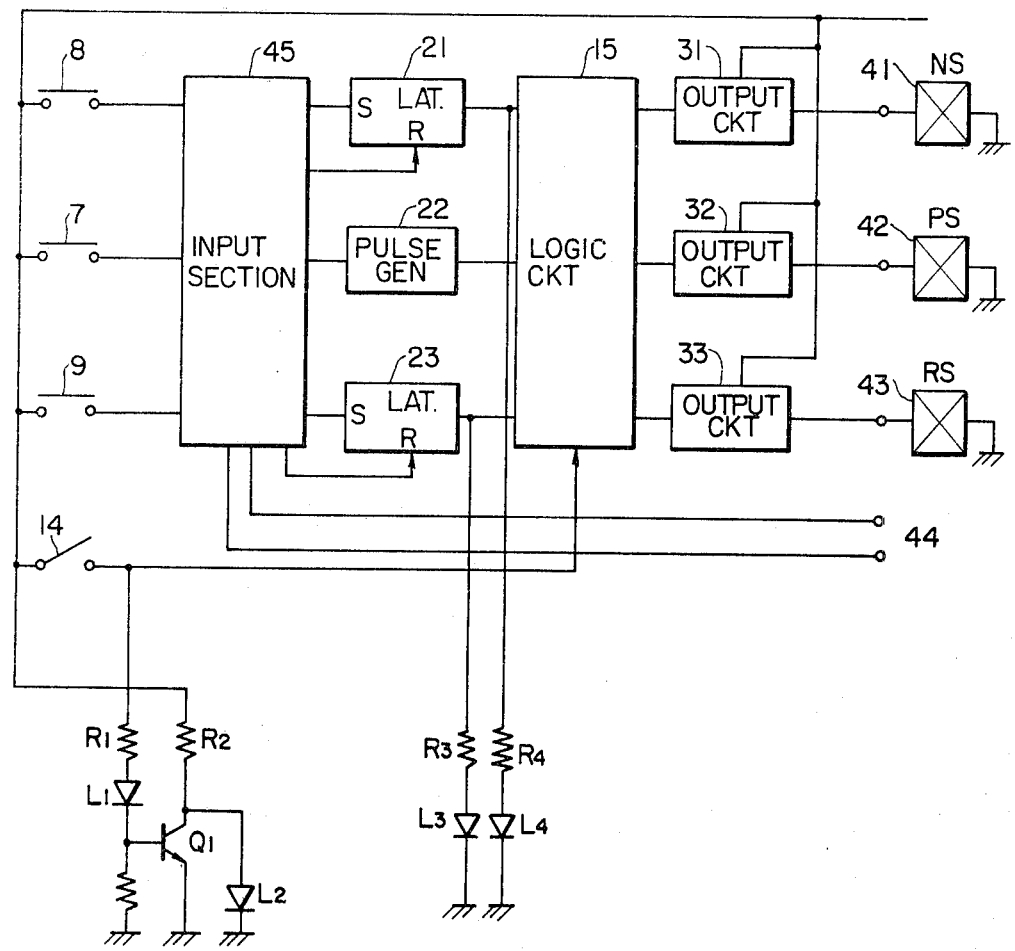
FIG. 8 is a partial block, partial circuit diagram of an embodiment of the invention incorporating latches, relays and light indicators.

FIG. 8 shows still another embodiment of the drive switching device in accordance with the invention. In this embodiment, solenoids NS, RS and PS are provided. By the actuation of either one of the solenoids, switching among the normal/reverse fast forward mode and the play mode is effected.

An input section 45 coupled to the fast forward switching button 8, the normal/reverse switching button 7 and rewind drive switching button 9 includes a multiple depression inhibiting circuit for preventing a malfunction caused by multiple depression of the buttons, reset circuit for resetting FF latch circuit 21, a pulse generator 22 and REW latch circuit 23, and a running direction switching circuit for switching the running direction of the tape in response to the signal produced upon detection of the end portion of the tape and fed through an input signal terminal 44. Each of the circuits contained in the input section 45 is known per se. The logic circuit 15 as described in conjunction with the embodiment shown in FIG. 5 is provided next to the latch circuits 21 and 23 and the pulse generator 22. Output circuits 31, 32 and 33 are provided in the output of the logic circuit 15 to energize the associated solenoids.

In the circuit arrangement as described above, by the depression of the FF button 8, the logic circuit 15 supplies its output to the output circuit 31 when the tape is in the play mode in the normal direction, so that the solenoid NS is energized and the tape is moved at the fast speed in the normal direction. On the other hand, when the tape is moving in the reverse direction, the logic circuit 15 supplies its output to the output circuit 33 to thereby cause the solenoid RS to be energized so that the tape is moved at the fast speed in the reverse direction. In order to change the direction of the playback mode, the button 7 is depressed. Upon depression of the button 7, the input section 45 applies an output through the pulse generator 22 to the logic circuit 15 and the latter supplies an output to the output circuit 32 to cause the solenoid PS to be energized, whereby reversing the direction of the playback mode. In this case, upon receipt of the output from the input section 45, the pulse generator 22 produces a predetermined number of pulses. Such pulses are applied through the logic circuit 15 to the output circuit 32.

In the above described circuit arrangement, if the tape is played in the normal direction in the case of energization of the solenoid PS and is played in the reverse direction in the case of non-energization thereof, the play mode changing operation can be achieved by the application of the tape running direction indicative signal to the input section 45 from the switch 14 while latching the pulse generator 22. Furthermore, in the above circuit arrangement, if the solenoids NS and RS of the hold type are used, the output circuit 31 and 33 provided in association therewith may simply comprise driver circuits. If the solenoids NS and RS are of the momentarily energized type, then the output circuits 31 and 33 may comprise monostable multivibrators.

For the display of the playback mode direction, fast forward and rewind, light emitting diodes (LED) $L_1$ through $L_4$ are provided. Specifically, the LEDs $L_4$ and $L_3$ are activated in response to the outputs of the FF and REW latch circuits 21 and 23, respectively. The LEDs $L_1$ and $L_2$ for the display of the play mode are activated by the switch 14. When the play mode is in the normal direction, the switch 14 is in the open state, thus a transistor $Q_1$ is rendered OFF. Accordingly, the LED $L_2$ is activated by the current flowing through a resistor $R_2$. On the other hand, when the play mode of the tape is in the reverse direction, the switch $S_{14}$ is closed, thus the LED $L_1$ is activated. At this time, since the transistor $Q_1$ is rendered ON, the LED $L_2$ is not activated. Consequently, the LED $L_2$ is used for the display of the normal direction mode and the LED $L_1$ for the display of the reverse direction playback mode.

Figure 9:
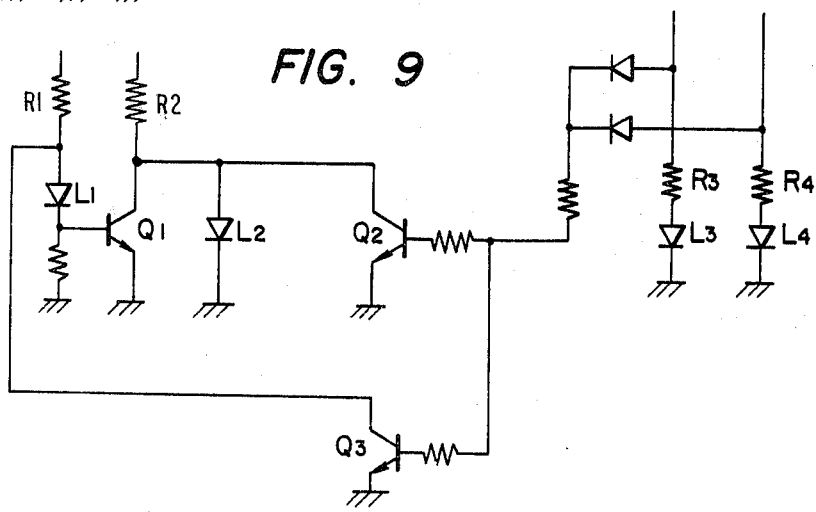
FIG. 9 is a circuit diagram of a variation of the light indicating portion of FIG. 8.

In the above connections of the LEDs, the LEDs for the display of the playback mode are activated even during the fast forward or the rewind operation. The circuit arrangement shown in FIG. 9 is a modification of the circuit shown in FIG. 8, in which both the transistors $Q_2$ and $Q_3$ are rendered ON whenever an output is delivered from either of the latch circuits 21 and 23 during the fast forward or rewind operation so as to deactivate the LEDS $L_1$ and $L_2$.

It should be appreciated from the foregoing description that since in the arrangement of the present invention the magnetic tape can be driven in a fast forward direction merely by depressing the fast forward drive switching button and can be also driven in a rewind direction merely by depressing the rewind drive switching button, it is not necessary to confirm the present magnetic tape driving direction and the operation can be executed merely by searching the corresponding button.

What is claimed is:

1. In an automatic reverse type magnetic tape recorder/reproducer of the type having a normal/reverse direction control means for controlling the direction of travel of said tape at normal speed, a normal direction fast speed control means for causing said tape to travel at a fast speed in the normal direction, and a reverse direction fast speed control means for causing said tape to travel at a fast speed in the reverse direction, the improvement comprising:
    a manually actuable fast-forward button;
    a manually actuable rewind button;
    switching means comprising first means responsive to said tape traveling in said normal direction and (i) to the actuation of said fast-forward button for actuating said normal direction fast speed control means, and (ii) to the actuation of said rewind button for actuating said reverse direction fast speed control means, and second means responsive to said tape traveling in said reverse direction and (i) to the actuation of said fast-forward button for actuating said reverse direction fast speed control means, and (ii) to the actuation of said rewind button for actuating said normal direction fast speed control means.

2. The system of claim 1 wherein said first and second means comprise a pair of switches being permanently connected at one terminal thereof to said fast forward and rewind buttons, respectively, and being switchably connectable at the opposite ends thereof to the actuation terminals of said normal direction and reverse direction fast speed control means.

3. The system of claim 2 wherein said switches are mechanically linked to said normal/reverse button to control the position of their said opposite ends.

4. The system of claim 2 wherein said switches are controlled by said tape direction during playback.

5. The system of claim 1 wherein said switching means comprises an electronic logic circuit having a fast forward input representing actuation of said fast forward button, a rewind input representing actuation of said rewind button, and a tape direction input representing the tape direction, said logic circuit having;
    first gating means responsive to said tape direction input indicating normal direction for connecting said fast forward input and said rewind input to said normal direction fast speed control means and said reverse direction fast speed control means, respectively; and
    second gating means responsive to said tape direction input indicating reverse direction for connecting said fast forward input and said rewind input to said reverse direction fast speed control means and said normal direction fast speed control means, respectively.

6. The system as claimed in claim 5 further comprising an input circuit connected between said normal/reverse buttons, said fast forward button, and said rewind button and said logic circuit, said input circuit comprising a multiple depression inhibiting circuit, a reset circuit, a fast forward latch, a rewind latch, and a pulse generator.

7. The system of claim 5 wherein said control means comprise solenoids.

8. The system of claim 5 further comprising indicator lights for indicating the respective conditions of normal direction, reverse direction, fast forward operation, and rewind operations.

9. The system of claim 8 further comprising blanking means responsive to either said fast forward operation or said rewind operation for blanking said normal and reverse indicator lights.

* * * * *